United States Patent [19]

Aas

[11] Patent Number: 5,754,881

[45] Date of Patent: May 19, 1998

[54] METHOD OF CONTROLLING A PC PARALLEL PORT SWITCH FOR CONNECTING MULTIPLE PERIPHERALS TO THE SAME PARALLEL PORT

[75] Inventor: Eric F. Aas, Windsor, Colo.

[73] Assignee: Hewlett-Packard Company, Palo Alto, Calif.

[21] Appl. No.: 378,130

[22] Filed: Jan. 24, 1995

[51] Int. Cl.⁶ ................................................. G06F 13/10
[52] U.S. Cl. ................................................. 395/822; 395/311
[58] Field of Search ........................... 395/822, 311, 395/280, 281

[56] References Cited

U.S. PATENT DOCUMENTS

| | | | |
|---|---|---|---|
| 5,133,055 | 7/1992 | Lieberman et al. | 395/889 |
| 5,234,700 | 8/1993 | Larsen et al. | 395/822 |
| 5,276,443 | 1/1994 | Gates et al. | 395/822 |
| 5,555,436 | 9/1996 | Gavish | 395/821 |

OTHER PUBLICATIONS

Diamond, Stephen L., "A new PC parallel interface standard", *IEEE Micro*, vol. 14, issue 4, Aug. 1994, pp. 3 and 78.
*Standard for Interface and Protocol Extensions to IEEE Std. 1284 Compliant Peripheral and Host Adapter Ports*, IEEE P1284.3, Draft D1.15 Sep. 13, 1994.

*Primary Examiner*—Glenn A. Auve

[57] ABSTRACT

A method for controlling a switch on the parallel port of a PC for the purpose of selecting between multiple peripherals connected to the parallel port is provided. In a first embodiment, the method includes setting a data value to control the switch. In a second embodiment, the method includes sending a PCL command sequence to control the switch. In a third embodiment, the method includes toggling a control line to control the switch. In a fourth embodiment, the method includes setting a control line and toggling a data line to control the switch.

21 Claims, 6 Drawing Sheets

METHOD OF CONTROLLING A PC PARALLEL PORT SWITCH FOR CONNECTING MULTIPLE PERIPHERALS TO THE SAME PARALLEL PORT

BACKGROUND OF THE INVENTION

1. Field of the Invention

The present invention relates generally to personal computer parallel port switching capabilities, and more specifically to a method for controlling a switch on the parallel port of a personal computer for the purpose of selecting between multiple peripherals connected to the same parallel port.

2. Description of Related Art

To interface with a peripheral, a personal computer ("PC") may employ any of several types of interfaces. The parallel port is a preferred interface because it provides for the transfer of 8 bits of data simultaneously (e.g., in parallel) to or from an attached peripheral, thus enhancing interface speed. The parallel port of a PC, however, does not provide addressing capability as provided by some other computer interfaces (e.g., Small Computer System Interface—"SCSI", Hewlett-Packard Interface Bus—"HPIB", or IEEE-488). As a result of this, only one peripheral may be connected to a PC parallel port at any given time.

There are obvious advantages to being able to connect multiple peripherals to a single PC parallel port. Some of these advantages include decreased hardware costs, simplified interface cabling, and simplified software configuration. Because of this, manually controlled "T-switches" have been developed. These manual T-switches permit a user to connect multiple peripherals to a single PC parallel port, and then to manually switch between them.

While this manual approach does permit the connection of multiple peripherals to a single port, it has not fully solved all of the associated problems. First, the user must manually switch the T-switch each time a different peripheral is to be addressed. Second, if the user forgets to switch the T-switch, the wrong peripheral will be connected to the interface when the user attempts to send or receive data. This may result in lost data or even system lock-up.

Therefore, there exists a need for a PC parallel port peripheral switch that will automatically switch between multiple peripherals, without requiring manual intervention. Ideally, such a switch will be under software control, and will operate in a manner that is transparent to the user.

SUMMARY OF THE INVENTION

The present invention is directed to a method for controlling a switch-box on the parallel port of a personal computer ("PC") for the purpose of selecting between multiple peripherals connected to the same parallel port. The present invention allows a host PC to connect one or more peripherals with a single interface port. A switch-box is connected between the PC interface port and each of the peripherals. The present invention allows the switch-box to selectively connect to the one or more peripherals. Where automatic control of the switch-box is desired, switching control may either be performed within the switch-box, in the host PC or in the attached peripherals. Where the switching control is not performed by switch-box, an input to the switch-box must be provided to signal the switch-box when to switch between the peripherals.

One system configuration in which the present invention may be utilized is where the switching control is performed by one of the peripherals attached to the switch-box (e.g., a scanner). Under this arrangement, the peripheral containing the switching control would remain connected to the PC interface at all times. When this peripheral detects predetermined data or control signals on the interface lines, it signals the switch-box to connect a designated peripheral to the PC interface.

In a first embodiment, the present invention comprises the steps of placing a data value on a PC parallel port bus, setting control logic on the bus to indicate a negotiation phase, detecting the value on the data bus, responding to the negotiation phase, and switching a switch-box in response to the detected value.

Alternatively, the present invention comprises the steps of sending a Printer Control Language ("PCL") command sequence, parsing the PCL command sequence and switching a switch-box in response to the parsed PCL command sequence.

Alternatively, the present invention comprises the steps of toggling a control line in a predetermined sequence, detecting the predetermined toggling sequence and switching a switch-box in response to the predetermined toggling sequence.

Alternatively, the present invention comprises the steps of setting a control line in a predetermined sequence, toggling a data line in a predetermined sequence, detecting the predetermined toggling sequence of the data line after the control line is in the predetermined state and switching a switch-box in response to the detected toggling sequence.

BRIEF DESCRIPTION OF THE FIGURES

The foregoing features and advantages of the present invention will be apparent from the following more particular description of the preferred embodiments of the invention, as illustrated in the accompanying drawings, wherein.

DETAILED DESCRIPTION OF THE PREFERRED EMBODIMENT

A preferred embodiment of the present invention is now described with reference to the figures where like reference numbers indicate identical or functionally similar elements. Also in the figures, the left most digit of each reference number corresponds to the figure in which the reference number is first used. While specific steps, configurations and arrangements are discussed, it should be understood that this is done for illustrative purposes only. A person skilled in the relevant art will recognize that other steps, configurations and arrangements can be used without departing from the spirit and scope of the invention.

The present invention is directed to PC parallel port switching capabilities, and more specifically to a method for controlling a switch on the parallel port of a PC for the purpose of selecting between multiple peripherals connected to the same parallel port. The general structure and operation of PC parallel ports are well known, and are therefore not discussed in detail.

Figure 1:
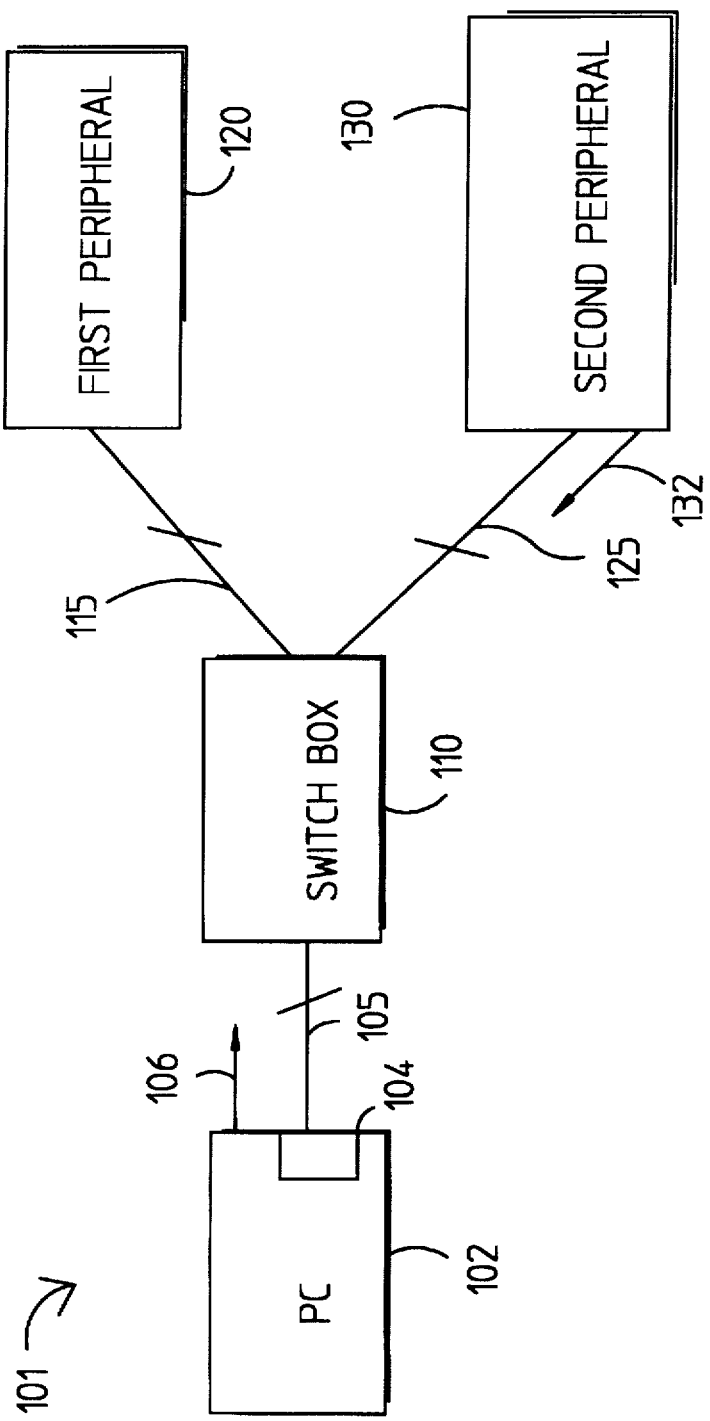
FIG. 1 depicts the configuration of a PC system incorporating a switch-box connected to a PC parallel port and controlled by the method of the present invention.

Referring to FIG. 1, the following discussion assumes that two peripherals (first peripheral 120 and second peripheral 130) are connected to a single PC parallel port 104 via a switch-box 110. One skilled in the art, however, will recognize that any number of peripherals can be connected to switch-box 110, and therefore to a single PC interface.

In operation, switch-box 110 is configured such that at power up, first peripheral 120 is connected to PC parallel port 104 via first cable 105 and second cable 115. In addition, switch-box 110 is designed such that at power up, second peripheral 130 is also connected to PC parallel port 104 via first cable 105 and third cable 125. First peripheral 120 may be any parallel port compatible peripheral, while second peripheral 130 is a parallel port compatible peripheral containing means for deciding when to signal switch-box 110 to switch. At power up, first peripheral 120 is in its normal operational mode, while second peripheral 130 is in a monitor mode only and therefore does not respond to any signals directed to first peripheral 120.

When a PC user (or the computer software) desires to disconnect first peripheral 120 and operatively connect second peripheral 130 to PC 102 parallel port 104, the method of the present invention is employed. To accomplish this peripheral selection, a first signal 106 is outputted from PC 102 via PC parallel port 104. Second peripheral 130 receives first signal 106 via third cable 125, and in response generates a second signal 132 which is fed to switch-box 110 to indicate that switching is desired.

Importantly, both first peripheral 120 and second peripheral 130 receive first signal 106. This is potentially a problem because first signal 106 is only intended to signify that switch-box 110 is to be switched, and is therefore not intended to be used in a way similar to signals normally seen on the parallel port interface (i.e., to send or receive data or equipment status). Therefore, in order to avoid undesired effects in first peripheral 120 (due to the receipt of first signal 106), either: (1) first signal 106 must be of a type that will not affect first peripheral 120, or (2) second peripheral 130 must cause switch-box 110 to disconnect first peripheral 120 before any undesired signal is received by first peripheral 120. Several methods for accomplishing this are detailed below.

Figure 2:
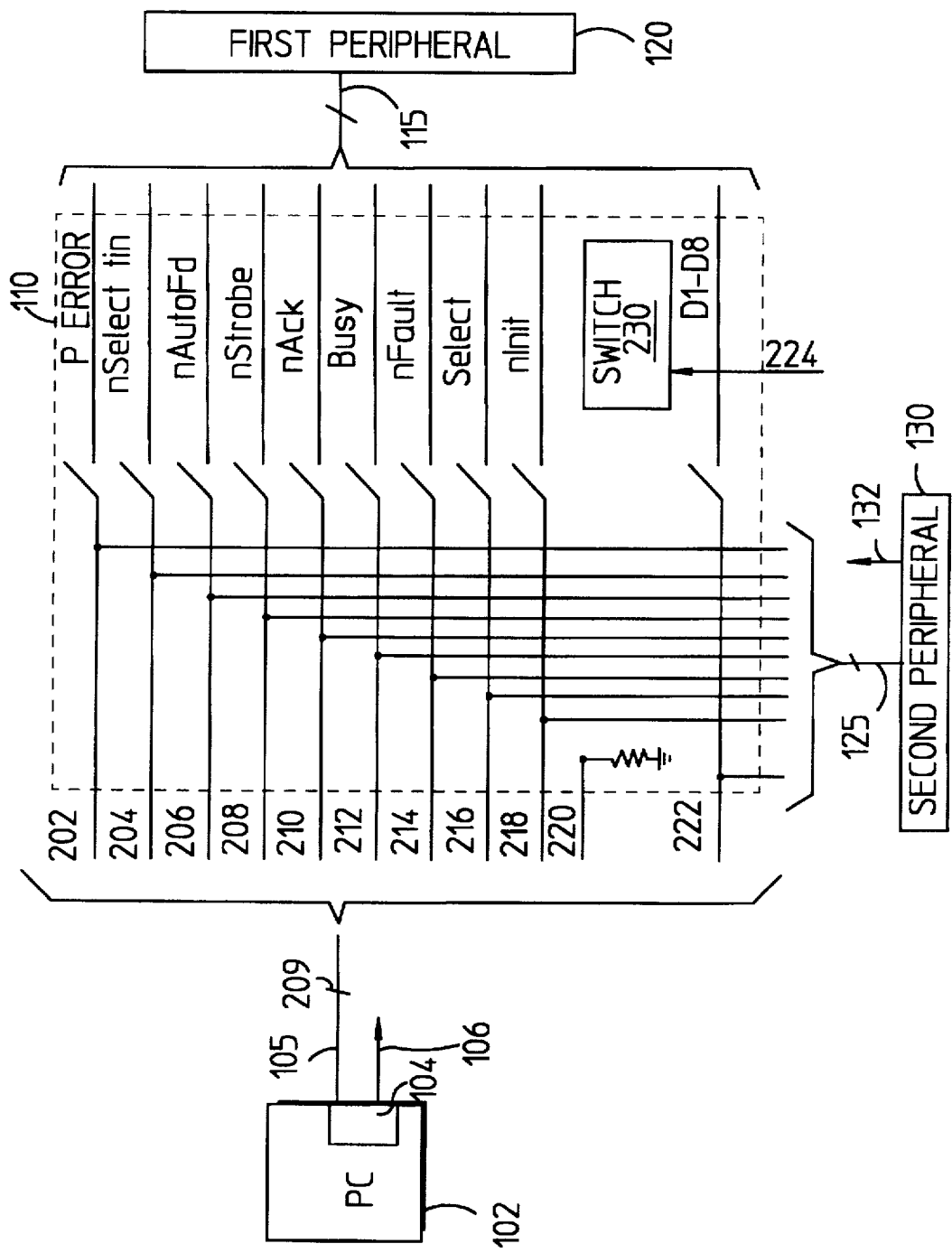
FIG. 2 depicts the bus configuration of a PC parallel port connected to two peripherals via a switch-box controlled by the method of the present invention.

First, however, a basic explanation of the operation of a parallel port may prove helpful. Operation of a parallel port conforming to the IEEE 1284 standard is discussed. The method of the present invention is, however, equally suited for use with a parallel port conforming to any other operating standard. Referring to FIG. 2, a 1284 parallel port interface bus 209 contains 9 control lines (202 through 218), two logic lines (220 and 224), and 8 data lines (222). Four of the control lines are driven by the host computer 102. These four control lines are: (1) nSelectIn 204; (2) nAutoFd 206; (3) nStrobe 208; and (4) nInit 218. A 1284 parallel port interface is in "compatibility mode" when these lines are driven low, high, high and high, respectively. Compatibility mode is the default mode, and is used by a 1284 parallel port to initiate communications with a peripheral attached to the PC.

The levels of the four control lines (204, 206, 208, and 218) are controlled by the parallel port driver software (not shown) running in the host PC 102. This driver software communicates with the parallel port 104 hardware to control the timing and state of all of the parallel port lines (control, logic and data).

To control the levels of these control lines (204, 206, 208 and 218) and the data lines (222) of the parallel port 104, there are three standard registers (not shown) contained in the PC 102: (1) a send data register; (2) a receive status register; and (3) a send control register. The normal address that is used for a parallel port is "LPT1," and a pointer to its location is stored at base address 40:0008H. This pointer is actually the address of the send data register. The address of the receive status register is the address of a pointer stored at 40:0008H plus 1H. Similarly, the address of the send control register is the address of a pointer stored at 40:0008H plus 2H. By writing values to the appropriate address, the associated control lines (nSelectIn 204, nAutoFd 206, nStrobe 208, and nInit 218) can be driven high or low. When there is no printing going on and the parallel port is in compatibility mode, the control lines are in the following states: nSelectIn 204 is low, nAutoFd 206 is high, nStrobe 208 is high, and nInit 218 is high.

By changing the value stored in the send control register, the control lines (204, 206, 208, and 218) for the parallel port 104 can be set in different states (e.g., high or low). Specific combinations of the states of these control lines can be used to indicate to second peripheral 130 that the host PC 102 wishes to communicate with second peripheral 130 (and not with first peripheral 120).

In contrast to the control lines, the levels of the logic lines (220 and 224) are controlled somewhat differently. Logic line 224 is named peripheral logic high, and is driven by an attached peripheral. Peripheral logic high 224 is used to indicate the status of the peripheral and/or peripheral-driven interface signals. For example, when peripheral logic high 224 is set high, this indicates that all other signals sourced by the peripheral are in a valid state. Conversely, when peripheral logic high 224 is set low, the peripheral power is off or the peripheral-driven interface signals are in an invalid state. Logic line 220 is named host logic high, and is driven by the host PC 102 (via parallel port 104). Host logic high 220 is used to indicate the status of the host PC 102 and/or host PC-driven interface signals. For example, when host logic high 220 is set high, this indicates that all other signals sourced by the host PC 102 are in a valid state. Conversely, when host logic high 220 is set low, this indicates that the host PC 102 power is off or the host PC-driven interface signals are in an invalid state. Host logic high 220 may be "wrapped" to allow PC 102 to determine the configuration of switch-box 110. Host logic high 220 may also be suitably terminated in switch-box 110 (e.g., tied to ground) as shown in FIG. 2.

Figure 3:
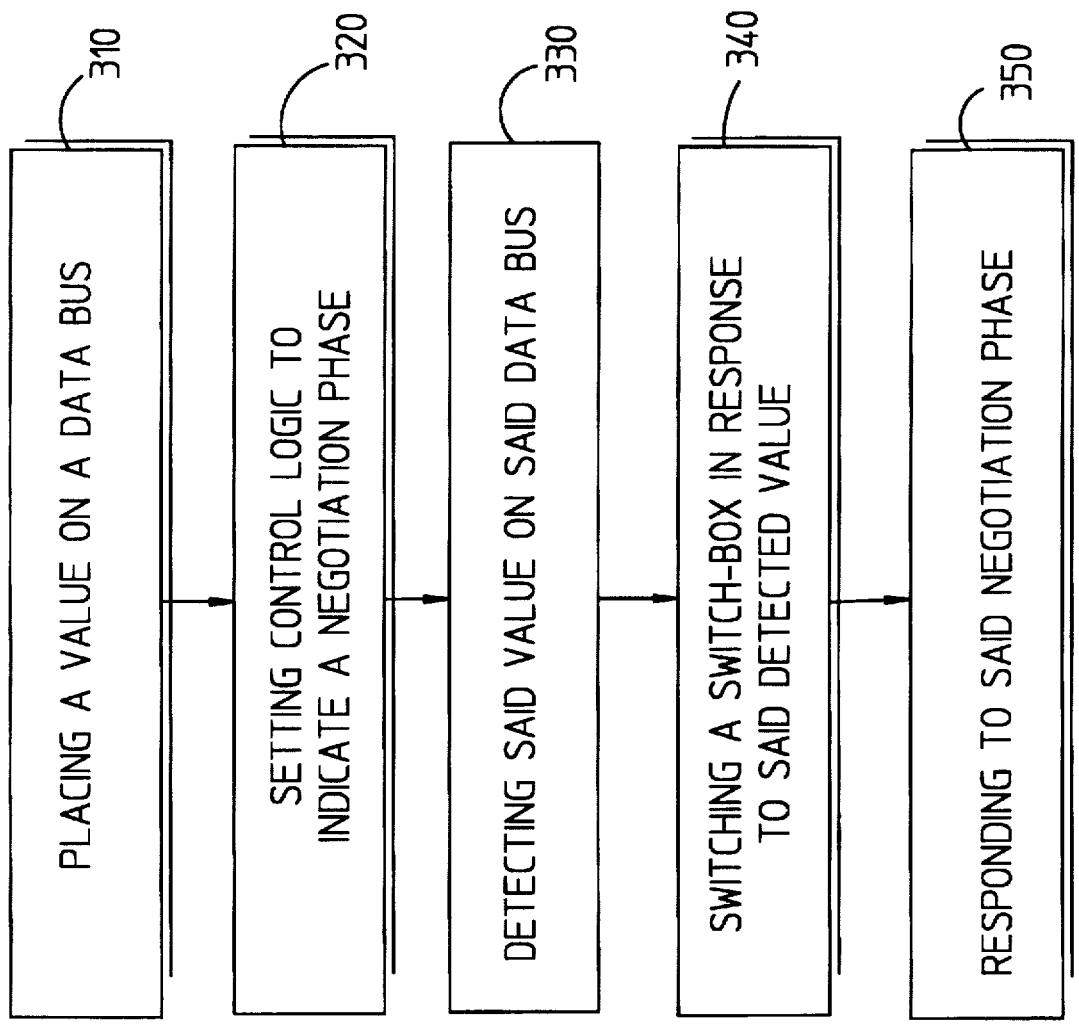
FIG. 3 is a flowchart depicting the process of one embodiment of the present invention.

Referring again to FIG. 2, and also to FIG. 3, one method of the present invention for switching switch-box 110 can now be explained. The method utilizes the handshaking protocol associated with a 1284 negotiation phase, which is normally used to initiate communications between a host PC and an attached peripheral. The method includes placing a data value on the PC parallel port data bus 222 and setting the control lines (204, 206, 208 and 218) to indicate a negotiation phase. Normally, host PC 102 would strobe the data value into an attached peripheral by toggling control signal nStrobe 208. According to the present invention, however, before the nStrobe signal 208 is strobed, second peripheral 130 detects the negotiation phase (via the data value and the control line signal levels) and switches switch-box 110. By switching switch-box 110 before the nStrobe 208 signal is generated, first peripheral 120 neither acts on nor responds to the negotiation phase. Rather, second peripheral 130 receives the negotiation phase data value and generates an appropriate response. The data value as well as the control line signals indicating a negotiation phase are generated inside PC 102. Second signal 132, which switches switch-box 110, is generated inside second peripheral 130. The process detailed above is illustrated in FIG. 3, blocks 310 to 350.

As stated above, second peripheral 130 generates second signal 132 to switch switch-box 110. In one embodiment of the present invention, second signal 132 is generated by using the peripheral logic high 224 signal. Specifically, when second peripheral 130 determines that switch-box 110 is to be switched, it drives peripheral logic high 224 to a low state. Peripheral logic high 224 is received by switch 230 in switch-box 110 (via third cable 125). Switch 230 of switch-box 110 is therefore designed such that when peripheral logic high is driven to a low state, switch-box 110 switches. This disconnects first peripheral 120 from PC 102, and therefore permits second peripheral 130 to operatively communicate with PC 102. As will be apparent to one skilled in the relevant art, switch 230 may be of any suitable type (e.g., a mechanical relay or an electronic switch).

Where PC parallel port 202 conforms to the 1284 standard, the step of placing a value on data bus 222 may include placing a value to indicate the 1284 mode that is requested (e.g., EPP, ECP, Byte, Nibble). To accomplish this, host PC 102 may write a value to the send data register that will tell second peripheral 130 to use one of four communication protocols (EPP, ECP, Byte, or Nibble). This value will also alert second peripheral 130 that host PC 102 wants to communicate with it, and not with first peripheral 120. One data value that can be used to accomplish this is 0×83H. This value may be written to the send data register as described above. The step of setting control logic to indicate a negotiation phase may further comprise delaying approximately 500 µS after the aforementioned value is placed on data bus 222, setting the nSelectIn control line 204 high and setting the nAutoFd control line 206 low. To set nSelectIn 204 high and nAutoFd 206 low, a value of 0×06H may be written to the send control register as described above. This combination of control signals alerts second peripheral 130 to read the data value on the data bus 222.

As stated above, a predetermined data value is used to indicate that switching of switch-box 110 is desired (in this example, 0×83H). If second peripheral 130 reads this predetermined value, second peripheral 130 generates second signal 132 which causes switch-box 110 to disconnect first peripheral 120 from PC parallel port 104. Second peripheral 130 must then respond to the negotiation phase initiated by host PC 102. This response is in accordance with standard 1284 protocol, as detailed in IEEE document P1284 D2.00 (available from IEEE Standards Dept., 445 Hoes Lane, P.O. Box 1331, Piscataway N.J. 08855-1331). According to IEEE P1284, the step of responding to the negotiation phase may generally comprise setting the nAck line 210 low, setting the nFault line 214 high and setting the Select line 216 high.

To further avoid the possibility of any undesired effects in any connected peripherals (i.e., first peripheral 120), the data value chosen as part of the negotiation phase to indicate that switch-box 110 is to be switched may be a data value that is not normally associated with a 1284 negotiation phase. In normal operation, a predetermined data value (along with predetermined control line logic) is used to signify a 1284 negotiation phase. This predetermined data value is known as an extensibility byte. Therefore, under the present invention, an extensibility byte other than one normally used in conjunction with a 1284 negotiation phase may be used. By using such an "illegal" extensibility byte as part of the present invention, the possibility of an undesired response by any peripheral connected to the PC parallel port 104 is further negated.

After switch-box 110 has switched, and the 1284 negotiation phase has been completed, host PC 102 can send and/or receive data to or from second peripheral 130. When first peripheral 120 is to be re-connected to host PC 102, a command in the form of a data byte can be sent from PC 102 to second peripheral 130. The steps detailed above would be used to send this command as well. After receiving this command, second peripheral 130 would again generate second signal 132 to switch switch-box 10. For example, second peripheral 130 would drive host logic high 224 to a high state, thus instructing switch 230 to switch switch-box 110. Switch-box 110 would then re-connect first peripheral 120 to PC parallel port 104. Finally, host PC 102 would write a value of 0×12H to the send control register (as described above) to return parallel port interface 104 to compatibility mode.

The embodiment of the present invention described above demonstrates a preferred method for utilizing undefined modes of the 1284 protocol to accomplish switch-box control. Because other undefined modes exist, those skilled in the art will recognize that similar techniques may be used to accomplish the switching function without undesirably affecting peripherals connected to the PC parallel port. Additional information regarding other undefined modes that can be utilized to control switch-box 110 in a similar fashion is provided in IEEE document P1284 D2.00.

Alternatively, the present invention may be accomplished by using a predetermined printer control language ("PCL") command sequence to indicate when switch-box 110 is to be switched. A PCL command sequence is a specific sequence of data bytes that is sent by host PC 102 out parallel port 104. These commands are interpreted by attached peripherals (e.g., printers and scanners) and control the operations that they perform. Therefore, a specific PCL command sequence could be defined to instruct a second peripheral 130 that switch-box 110 installed on parallel port 104 is to be switched.

Similar to the negotiation phase embodiment described above, when a PCL command sequence is used to indicate that switch-box 110 is to be switched, care must be taken to avoid any causing undesired effects in each peripheral that may receive the PCL command sequence. Recall that initially, first peripheral 120 and second peripheral 130 both receive signals sent out PC parallel port 104. For this reason, the PCL command sequence chosen to indicate when switch-box 110 is to be switched should be a command sequence that will not have an undesired effect on peripherals attached to PC parallel port 104.

For example, the PCL command sequence <esc*SSd64> could be defined as the command which indicates that switch-box 110 is to be switched. Similarly, the command sequence <esc*SSd65> could be defined as the command which indicates that switch-box 110 is to be switched back. Switch-box 110 could therefore be controlled merely by sending a PCL command sequence which includes the predetermined <esc*SSd64> command from parallel port 104 of PC 102. Upon receipt of a PCL command sequence, second peripheral 130 would "parse" the command sequence to check for receipt of the predetermined switch command (i.e., <esc*SSd64>). If the predetermined PCL command sequence is detected, second peripheral 130 would generate second signal 132 to switch switch-box 110. After switch-box 110 is switched, first peripheral 120 would be disconnected from host PC 102, while second peripheral 130 would remain connected.

Figure 4:
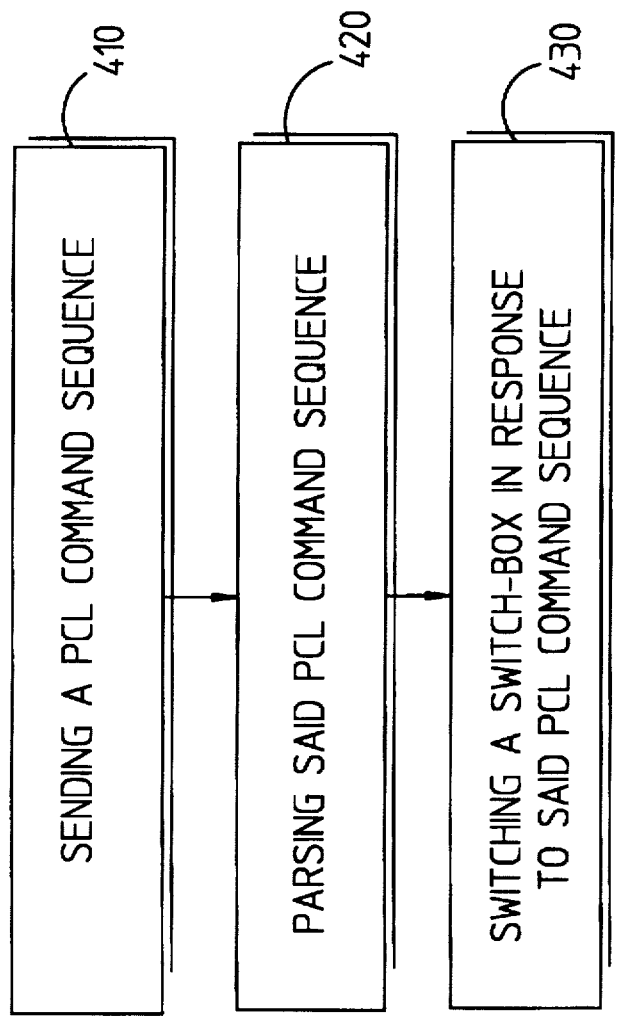
FIG. 4 is a flowchart depicting the process of a second embodiment of the present invention.

In order to switch switch-box 110 back to its original state (i.e., to re-connect first peripheral 120), a PCL command sequence containing, for example, the command <esc*SSd65> would be sent via PC parallel port 104. Upon receiving and detecting this command, second peripheral 130 would signal switch-box 110 to switch back to its original configuration. First peripheral 120 would therefore be reconnected to PC 102. The process detailed above is illustrated in FIG. 4, blocks 410 to 430.

Figure 5:
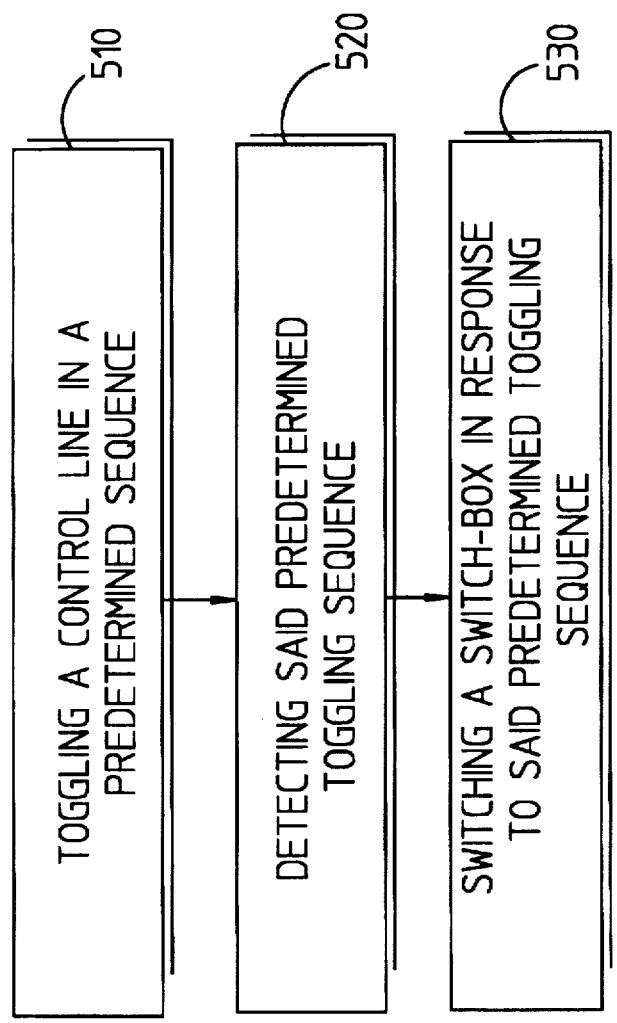
FIG. 5 is a flowchart depicting the process of a third embodiment of the present invention.

Alternatively, the method of the present invention may be accomplished by toggling a control line of PC parallel port 104 in a predetermined sequence to indicate that switching of switch-box 110 is desired. The predetermined toggling sequence is generated within PC 102 by writing appropriate values to the send control register described above. When second peripheral 130 detects the predetermined sequence, it generates second signal 132 which signals switch-box 110 to switch. To avoid undesired effects in attached peripherals (i.e., in first peripheral 120), the control line toggled as well as the toggling sequence selected, must be such that no undesired effect occurs as a result. The process detailed above is illustrated in FIG. 5, blocks 510 to 530.

By way of example, referring again to FIG. 2, control line nSelectIn line 204 may be toggled, timed relative to the central processing unit ("CPU") clock of PC 102 (e.g., high, low, high, low, high, high, low, low, high). This is accomplished by writing appropriate values to the send control register in PC 102.

Figure 6:
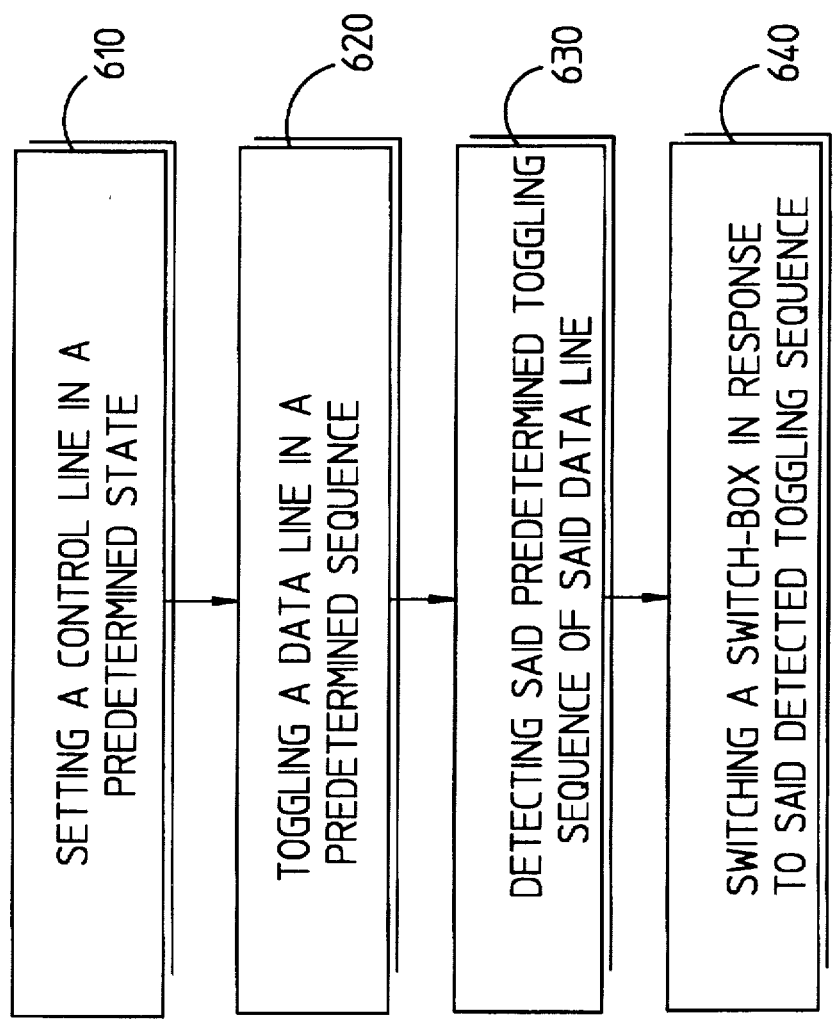
FIG. 6 is a flowchart depicting the process of a fourth embodiment of the present invention.

Alternatively, the method of the present invention may be accomplished by setting the state of one or more of the control lines 202–218 in a predetermined state and also toggling a data line 222 in a predetermined sequence. The state of control lines 202–218 is controlled by writing appropriate values to the send control register in PC 102. The toggling of the data lines 222 is controlled by writing appropriate values to the send data register in PC 102. The predetermined state/toggling combination generated in PC 102 is detected by second peripheral 130, which in turn generates second signal 132 to switch switch-box 110. For reasons discussed above, the combination selected must be one which does not create any undesired effects in first peripheral 120 (or any other attached peripheral). The process detailed above is illustrated in FIG. 6, blocks 610 to 640.

For example, the step of setting the one or more control lines 202–218 in a predetermined state may include setting the nSelectIn control line 204 high, setting the nAutoFd control line 206 high, and setting the nStrobe control line 208 high. Any predetermined data toggling sequence could then be employed, given that no 1284 protocol restrictions exist concerning the validity (or invalidity) of data values on a PC parallel port data bus 222.

In each embodiment of the present invention described above, second peripheral 130 generated second signal 132 to switch switch-box 110. Alternatively, second signal 132 could be generated by host PC 102, a different attached peripheral, or switch-box 110 itself. Accordingly, while the present invention has been particularly shown and described with reference to a preferred embodiment thereof, it will be understood by those skilled in the art that various changes in form and details may be made therein without departing from the spirit and scope of the invention.

What is claimed is:

1. A method for controlling a switch on a parallel port of a PC for the purpose of selecting via a switch-box between a plurality of peripherals connected to the parallel port, wherein the plurality of peripherals are connected to the parallel port via a control bus and data bus comprising the steps of:

sending a PCL command sequence via the parallel port to the plurality of peripherals;

parsing said PCL command sequence; and switching the switch-box in response to said PCL command sequence.

2. The method of claim 1, wherein the step of sending a PCL command sequence further comprises sending a PCL command sequence that has no undesired effect on attached peripherals.

3. The method of claim 1, wherein the parsing of said PCL command sequence further comprises detecting a specific command sequence in a switch controller.

4. The method of claim 1, wherein the step of switching said switch-box further comprises signalling said switch-box to switch in response to said PCL command sequence.

5. A method for controlling a switch on a parallel port of a PC for the purpose of selecting via a switch-box between a plurality of peripherals connected to the parallel port, wherein the plurality of peripherals are connected to the parallel port via a control bus and data bus, comprising the steps of:

placing a value on the data bus,
wherein the step of placing said value on the data bus further comprises
placing a value on the data bus to indicate that a 1284 mode is requested;
setting the control bus to indicate a negotiation phase, wherein the control bus includes a plurality of control lines;
detecting said value on the data bus;
switching the switch-box in response to said detected value; and
responding to said negotiation phase.

6. The method of claim 5, wherein the step of placing a value on the data bus further comprises placing an illegal extensibility byte value to indicate that the switch-box is to be switched.

7. The method of claim 5, wherein the step of switching said switch-box further comprises switching said switch-box before said value is strobed into a peripheral.

8. The method of claim 5, wherein switching control is performed within the switch-box.

9. The method of claim 5, wherein switching control is performed within the PC.

10. The method of claim 5, wherein switching control is performed within one of the plurality of peripherals.

11. A method for controlling a switch on a parallel port of a PC for the purpose of selecting via a switch-box between a plurality of peripherals connected to the parallel port, wherein the plurality of peripherals are connected to the parallel port via a control bus and data bus, comprising the steps of:

placing a value on the data bus;
setting the control bus to indicate a negotiation phase,
wherein the control bus includes a plurality of control lines,
wherein said plurality of control lines include a first control line, nSelectIn, and a second control line, nAutoFd, and wherein the step of setting the control bus to indicate a negotiation phase further comprises:
  delaying approximately 500 μS after said value is placed on the data bus;
  setting said first control line, nSelectIn, high; and
  setting said second control line, nAutoFd, low;
detecting said value on the data bus;
switching the switch-box in response to said detected value; and
responding to said negotiation phase.

12. The method of claim 11, wherein said control bus contains a third control line, nAck, a fourth control line, nFault, and a fifth control line, Select, wherein the step of responding to said negotiation phase further comprises:
  setting said third control line, nAck, low;
  setting said fourth control line, nFault, high; and
  setting said fifth control line, Select, high.

13. The method of claim 11, wherein the step of switching said switch-box further comprises switching said switch-box before said value is strobed into a peripheral.

14. The method of claim 11, wherein switching control is performed within the switch-box.

15. The method of claim 11, wherein switching control is performed within the PC.

16. The method of claim 11, wherein switching control is performed within one of the plurality of peripherals.

17. A method for controlling a switch on a parallel port of a PC for the purpose of selecting via a switch-box between a plurality of peripherals connected to the parallel port, wherein the plurality of peripherals are connected to the parallel port via a control bus and data bus, comprising the steps of:

placing a value on the data bus;

setting the control bus to indicate a negotiation phase,
  wherein the control bus includes a plurality of control lines, and
  wherein said plurality of control lines include a first control line, nAck, a second control line, nFault, and a third control line, Select;

detecting said value on the data bus;

switching the switch-box in response to said detected value; and responding to said negotiation phase,
  wherein the step of responding to said negotiation phase comprises:
    setting said first control line, nAck, low;
    setting said second control line, nFault, high; and
    setting said third control line, Select, high.

18. The method of claim 17, wherein the step of switching said switch-box further comprises switching said switch-box before said value is strobed into a peripheral.

19. The method of claim 17, wherein switching control is performed within the switch-box.

20. The method of claim 17, wherein switching control is performed within the PC.

21. The method of claim 17, wherein switching control is performed within one of the plurality of peripherals.

* * * * *